(12) United States Patent
Pfitzer et al.

(10) Patent No.: US 8,929,042 B2
(45) Date of Patent: Jan. 6, 2015

(54) SURGE PROTECTIVE DEVICE WITH CONTOLLER

(75) Inventors: Hans-Erik Pfitzer, Chesterfield, VA (US); Martin William Guy, Chester, VA (US)

(73) Assignee: Thomas & Betts International, Inc., Wilmington, DE (US)

( * ) Notice: Subject to any disclaimer, the term of this patent is extended or adjusted under 35 U.S.C. 154(b) by 143 days.

(21) Appl. No.: 13/402,348

(22) Filed: Feb. 22, 2012

(65) Prior Publication Data

US 2012/0250205 A1    Oct. 4, 2012

Related U.S. Application Data

(60) Provisional application No. 61/469,188, filed on Mar. 30, 2011.

(51) Int. Cl.
H02H 9/04 (2006.01)

(52) U.S. Cl.
CPC .................................... *H02H 9/041* (2013.01)
USPC ...................................................... 361/91.1

(58) Field of Classification Search
CPC ......... H02H 9/04; H02H 9/041; H02H 9/042; H02H 9/046; H02H 9/049
USPC ...................................................... 361/91.1
See application file for complete search history.

(56) References Cited

U.S. PATENT DOCUMENTS

| | | | |
|---|---|---|---|
| 4,023,071 A | 5/1977 | Fussell | |
| 4,322,767 A | 3/1982 | El Hamamsy et al. | |
| 4,563,720 A | 1/1986 | Clark | |
| 4,677,518 A | 6/1987 | Hershfield | |
| 4,799,125 A | 1/1989 | Crofts et al. | |
| 4,802,055 A | 1/1989 | Beckerman | |
| 4,807,081 A | 2/1989 | Crofts et al. | |
| 4,860,155 A | 8/1989 | Wright | |
| 4,912,589 A | 3/1990 | Stolarczyk | |
| 4,999,728 A | 3/1991 | Curl | |
| 5,023,746 A | 6/1991 | Epstein | |
| 5,392,188 A | 2/1995 | Epstein | |
| 5,532,635 A | 7/1996 | Watrous et al. | |
| 5,559,656 A | 9/1996 | Chokhawala | |
| 5,610,793 A | 3/1997 | Luu | |
| 5,617,284 A | 4/1997 | Paradise | |
| 5,621,599 A | 4/1997 | Larsen et al. | |
| 5,675,468 A * | 10/1997 | Chang ........................... 361/119 | |
| 6,226,162 B1 | 5/2001 | Kladar et al. | |
| 6,226,166 B1 | 5/2001 | Gumley et al. | |

(Continued)

OTHER PUBLICATIONS

International Standard, "Part 1: Surge Protective Devices Connected to Low-Voltage Power Distribution Systems Requirements and Tests," IEC 61643-1, Mar. 2005, 168 pages.

*Primary Examiner* — Jared Fureman
*Assistant Examiner* — Kevin J Comber
(74) *Attorney, Agent, or Firm* — Snyder, Clark, Lesch & Chung, LLP

(57) ABSTRACT

A surge protective device is disclosed that may include a comparator to determine when a line voltage of a line is above a threshold. The device may include a switch to couple a clamping device to the line voltage when the comparator determines the line voltage is above a threshold, wherein the clamping device shunts current from the line. The switch may include a silicon-controlled rectifier (SCR) or a thyristor and the clamping device may include a selenium surge suppression device.

20 Claims, 13 Drawing Sheets

(56) References Cited

U.S. PATENT DOCUMENTS

| | | |
|---|---|---|
| 6,407,901 B1 | 6/2002 | Casey et al. |
| 6,535,369 B1 * | 3/2003 | Redding et al. ............... 361/111 |
| 6,714,061 B2 | 3/2004 | Hareland |
| 6,727,555 B2 * | 4/2004 | Heinisch et al. ............... 257/355 |
| 7,242,566 B2 | 7/2007 | Yegin et al. |
| 7,245,470 B2 | 7/2007 | Hoopes |
| 7,684,165 B2 * | 3/2010 | Berberich et al. ............ 361/103 |
| 2011/0279940 A1 * | 11/2011 | Xu ............................... 361/91.1 |

\* cited by examiner

SURGE PROTECTIVE DEVICE WITH CONTOLLER

This patent application claims priority to Provisional Application No. 61/469,188, filed Mar. 30, 2011, which is incorporated herein by reference.

BACKGROUND OF THE INVENTION

A surge protective device (SPD) may be used to protect a circuit or load against excessive transient voltages. When triggered by a sufficiently high voltage, the SPD may shunt current that accompanies the high voltage away from the circuit or load that the SPD protects. An SPD may be deployed within electronic devices or in a power distribution system (e.g., at the point where an electrical wire enters a building or throughout a building).

DETAILED DESCRIPTION OF THE PREFERRED EMBODIMENTS

Various standards define the types of surges that surge protectors are designed to protect against. These standards include the International Electrotechnical Commission (IEC) 61643-1 standard, the European Committee for Standardization (EN) 61643-11 and -21, the Telcordia Technologies Technical Reference TR-NWT-001011, the American National Standards Institute (ANSI) and Institute of Electrical and Electronics Engineers (IEEE) C62.xx standard, and the Underwriters Laboratories Inc. (UL) 1449 standard. Each standard may define different characteristics of surges, different test vectors, or operational purposes. For example, the IEC 61643-1 standard may require a surge protector to remain functional during and after a series of fifteen 8/20 µs surges of 20 kA for some devices. In some instances, this standard may require a surge protector to remain functional during and after a series of five 10/350 µs surges described by peak current, charge, and specific energy. Regardless, over time, the requirements for surge protectors have become more stringent as more of society's critical infrastructure is powered by electricity.

Figure 1A:
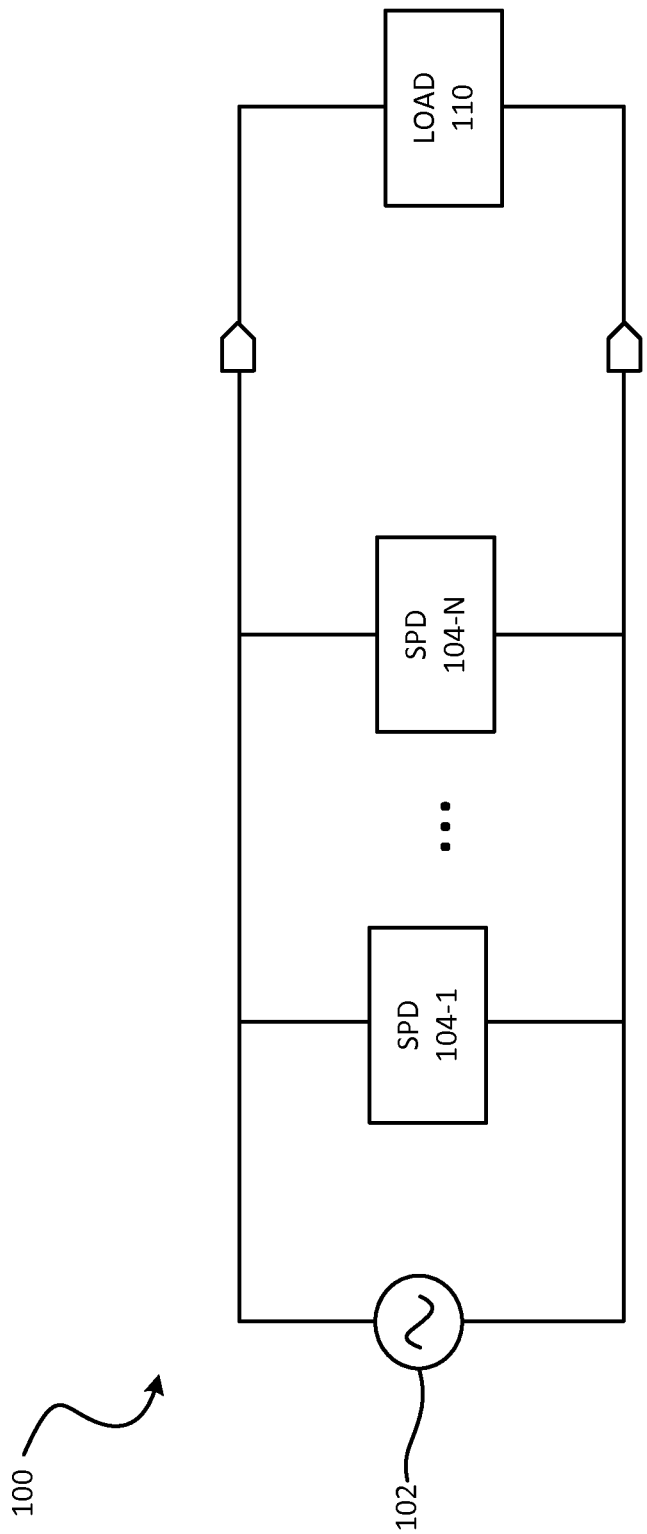
FIG. 1A is a diagram of an exemplary circuit including surge protective devices (SPDs)

FIG. 1A is a diagram of an exemplary circuit 100 with a number (N) of surge protective devices (SPDs). As shown, a first SPD 104-1 through an Nth SPD 104-N (collectively "SPDs 104," individually "SPD 104-x") protect a load 110. Circuit 100 also includes an alternating current (AC) power source 102 for powering load 110 (e.g., a motor, a building, etc.), although direct current (DC) power supplies may be used in some implementations. Each SPD 104-x may protect load 110 against excessive transient voltages. An excessive voltage may be created when, for example, lightning strikes circuit 100. When triggered by a sufficiently high voltage, SPD 104-x may shunt current that may accompany the high voltage away from load 110, which may protect load 110 from potential damage. SPDs 104 may be connected in parallel between a power line and a ground line, between a power line and a neutral line, between a neutral line and a ground line, or between a power line and another power line.

Figure 1B:
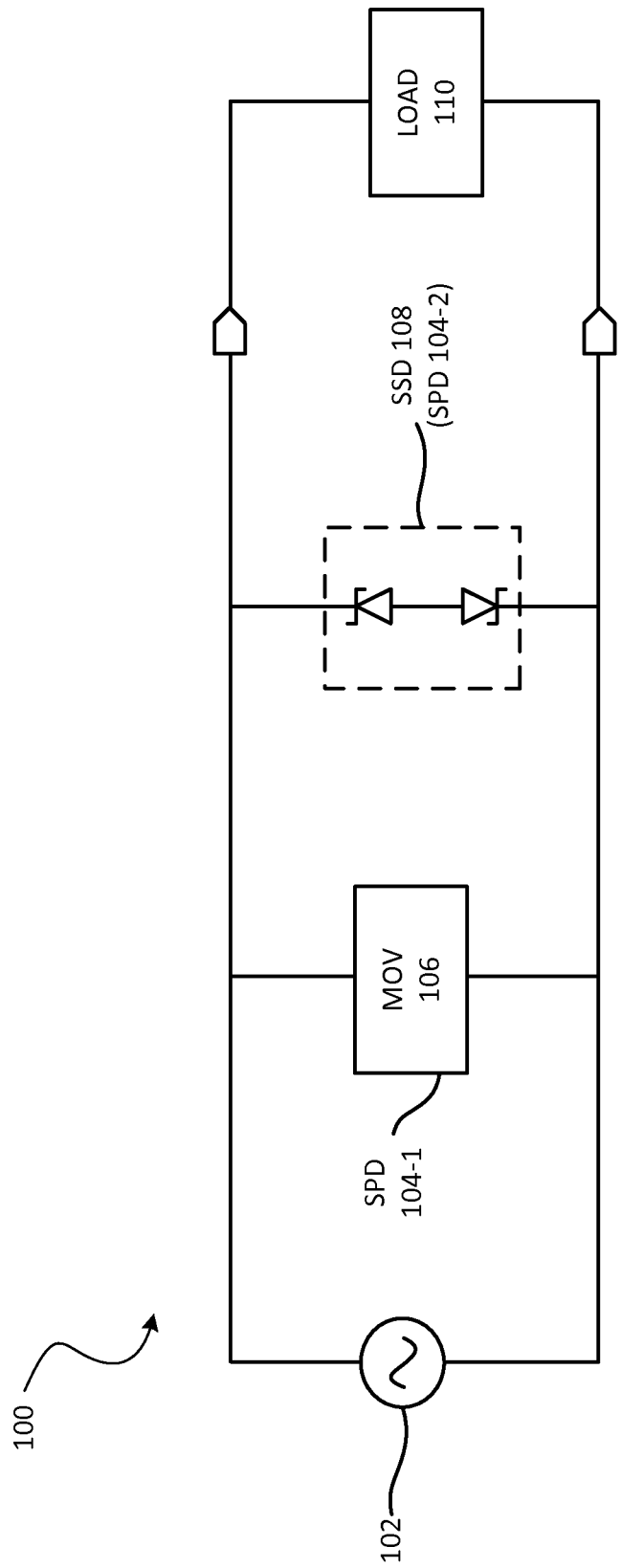
FIG. 1B is a diagram of an exemplary circuit including two SPDs.

FIG. 1B is a diagram of circuit 100 in an exemplary configuration with two SPDs. First SPD 104-1 includes a metal-oxide varistor (MOV) 106 and second SPD 104-2 includes a selenium surge suppression device (SSD) 108, which can be understood and modeled as back-to-back Zener diodes. Circuit 100 may include additional, fewer, or a different arrangement of components than shown in FIG. 1B. For example, circuit 100 may include more than two SPDs.

MOV 106 (e.g., first SPD 104-1) may include a ceramic mass of zinc oxide grains, in a matrix of other metal oxides, between two metal plates. The boundary between the grains forms a diode junction, and the operation of MOV 106 is similar to that of a reversed-biased diode. When a small voltage (e.g., less than the breakdown voltage of MOV 106) is applied across MOV 106, only a small current flows through MOV 106, caused by reverse leakage through the diode junction. When a sufficiently large voltage (e.g., greater than the breakdown voltage of MOV 106) is applied across MOV 106, the diode junction breaks down and current is allowed to flow through MOV 106. The result of this behavior is a highly nonlinear current-voltage characteristic, in which MOV 106 has a high impedance at low voltages and a low impedance at high voltages. Thus, during normal operating conditions (e.g., non-surge conditions), the impedance through MOV 106 may be extremely high with only a small current flowing through MOV 106. When the voltage across MOV 106 exceeds a threshold (e.g., an over-voltage or surge condition), the impedance across MOV 106 (e.g., through the MOV) may be significantly reduced, allowing current to flow (e.g., be shunted) through MOV 106 to protect load 110. While shunting the current flow, MOV 106 may heat up significantly, a condition that itself could lead to a dangerous failure condition (e.g., damage to load 110) or the failure of MOV 106.

SSD 108 may operate similarly to MOV 106 in some aspects. For example, when the voltage across SSD 108 exceeds a threshold (e.g., an over-voltage or surge condition), the impedance of SSD 108 may be significantly reduced, allowing current to flow (e.g., be shunted) through SSD 108 to protect load 110. While shunting the current flow, SSD 108 may heat up significantly, a condition that itself could lead to a dangerous failure condition (e.g., damage to load 110). Although SPD 104-2 in FIG. 1B is an SSD, other types of protective devices are possible, such as a silicon avalanche diode (SAD), a gas discharge tube (GDT), an MOV, a zener diode, a transient suppression diode, a quarter-wave coaxial surge arrestor, a Silicon carbide surge arrestor or varistor (SiCV), and/or a carbon block spark gap overvoltage suppressor.

While MOV 106 may provide some protection against over-voltage or surge conditions, the ability to protect may last a short time as compared to the protection provided by SSD 108, for example, because MOV 106 may not have as large a thermal mass as SSD 108. On the other hand, SSD 108 may not turn on as fast as MOV 106, for example. Thus, SSD 108 may turn on and shunt current after MOV 106, but in one embodiment SSD 108 may shunt current for a longer period of time than MOV 106. In fact, SSD 108 may help protect MOV 106 from an over-voltage condition as well as load 110.

Figure 1C:
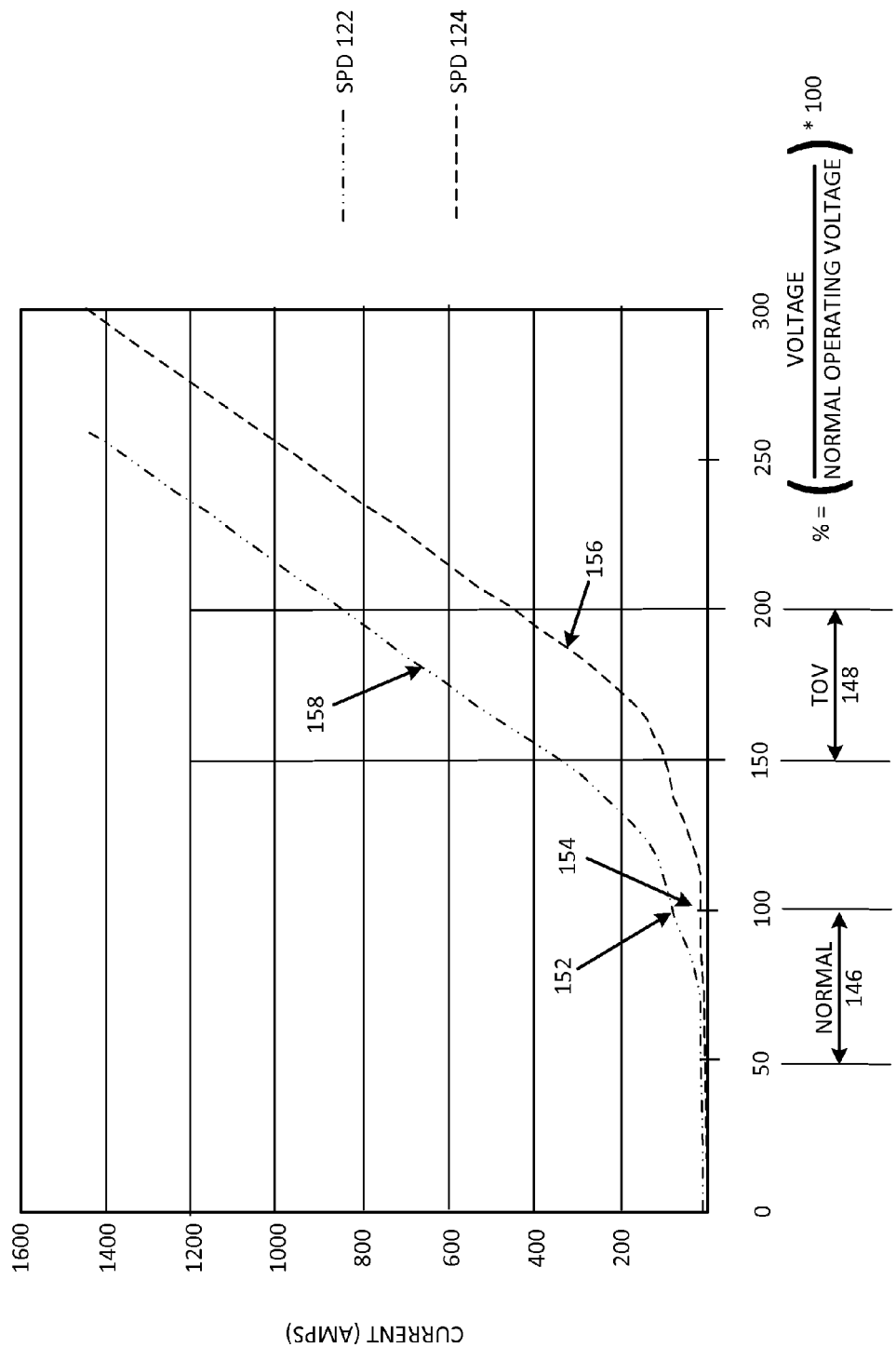
FIG. 1C is a plot of exemplary current-voltage characteristics of two SPDs.

The current-voltage (IV) characteristic of SSD 108, like other surge protective devices, should be such that SSD 108 does not turn on during normal operating conditions, but turns on sufficiently at a voltage above the normal operating voltage, such as 150% above normal operating conditions. If SSD 108 turns on "slowly," meeting such constraints may pose a challenge. FIG. 1C is a plot of exemplary current-voltage (IV) characteristics of two SPDs, such as two SSDs. The IV characteristics shown in FIG. 1C illustrate concepts of the embodiments disclosed herein. The IV characteristics of actual components may vary from what is shown in FIG. 1C without departing from the embodiments described. The ordinate in FIG. 1C plots current from 0 Amps to 1600 Amps. The abscissa in FIG. 1C plots voltage as a percentage, where 100% is the normal operating voltage and 150% is 1.5 times the normal operating voltage. In the case of AC power, the normal operating voltage may be the peak voltage or the root-mean-square (RMS) voltage of power supply 102. In the case of DC power, the normal operating voltage may be the expected DC voltage. The abscissa includes two ranges: a normal range 146, from 50% to 100% of the normal operating voltage; and a Transient-Over-Voltage (TOV) range from 150% to 200% (or more) of the normal operating voltage. The desired IV characteristic of an SPD, in one embodiment, is for the SPD to be off (e.g., not conducting) in normal range 146 and on (e.g., conducting) in TOV range 148.

FIG. 1C includes two plots, one for an SPD 122 (shown with a dashed and dotted line) and another one for SPD 124 (shown with a dashed line). The IV characteristic of SPD 122 indicates at a point 152 that SPD 122 has begun to turn on at normal operating conditions (e.g., 100%), which is undesirable because, in this case, SPD 122 would be shunting current (e.g., approximately 100 Amps) in normal range 146. On the other hand, the IV characteristic of SPD 124 shows the desired characteristic at a point 154 in normal range 146, where SPD 124 is off or conducting near-zero current. The IV characteristic for SPD 124 indicates at point 156 in TOV range 148 that SPD 124 is conducting current, but is not conducting as much current as SPD 122 in TOV range 148 (e.g., at point 158). In the following example, the IV characteristic of SPD 122 in TOV range 148 (e.g., point 158) is more desirable than the IV characteristic of SPD 124 in TOV range 148 (e.g., point 156).

Thus, although SPD 122 has desirable characteristics in TOV range 148 (e.g., point 158), it has undesirable characteristics in normal range 146 (e.g., point 152). In contrast, although SPD 124 has desirable characteristics in normal range 146 (e.g., point 154), it has less desirable characteristics in TOV range 148 (e.g., point 156).

Figure 2A:
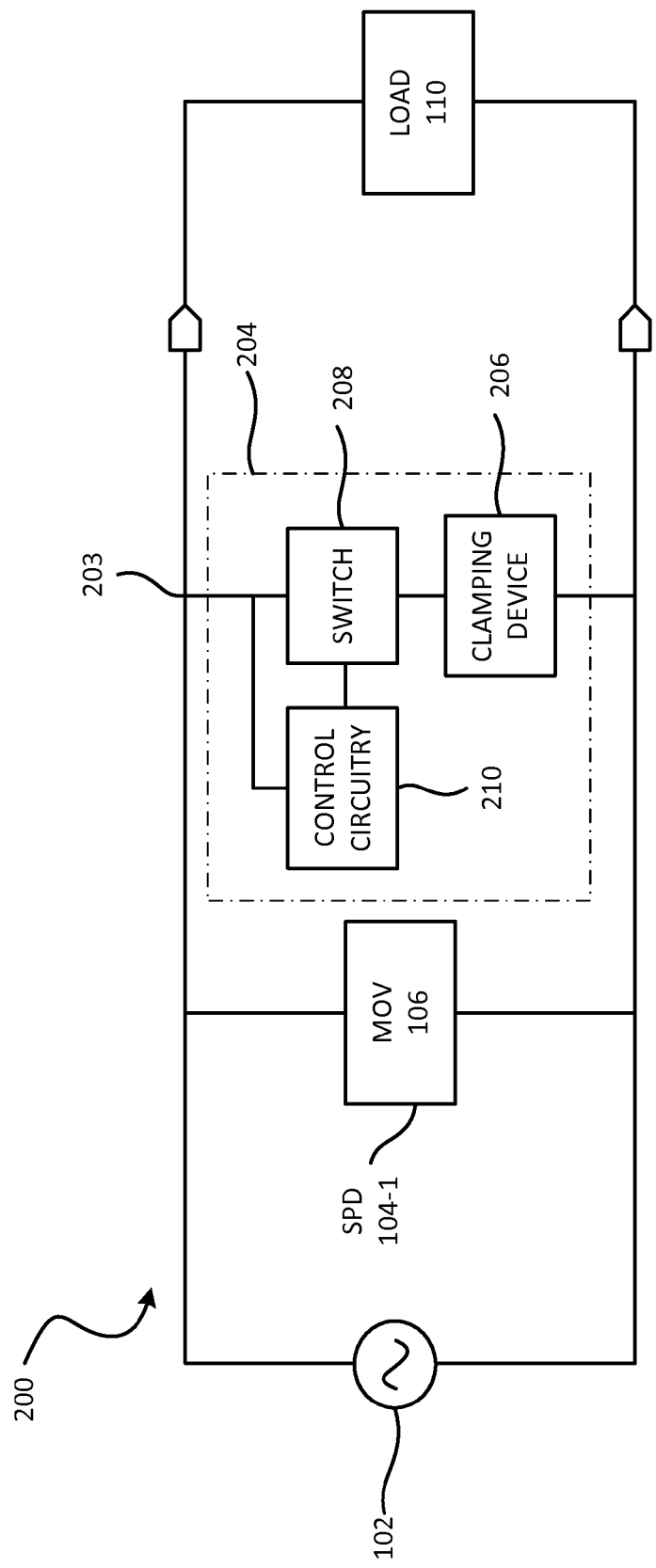
FIG. 2A is a diagram of an exemplary circuit including two SPDs in one embodiment.

FIG. 2A is a diagram of an exemplary circuit 200 in one embodiment. Circuit 200 includes a first SPD device 104-1 (e.g., MOV 106) and a second SPD device 204. SPD device 204 includes a clamping device 206, a switch 208, and control circuitry 210. Circuit 200 may include additional, fewer, or a different arrangement of components. For example, in other embodiments, circuit 200 may include additional SPDs not shown.

Clamping device 206 may include a surge protective device, such as a SAD, a GDT, an MOV, a SiCV, a zener diode, a transient suppression diode, a quarter-wave coaxial surge arrestor, and/or a carbon block spark gap overvoltage suppressor. When the voltage across clamping device 206 is sufficient, the impedance through clamping device 206 may allow for current to flow through clamping device 206 so as to protect load 110, for example. When the voltage across clamping device 206 is insufficient, the impedance through clamping device may be such that no or little current flows through clamping device 206.

Switch 208 may allow current to flow through switch 208 when switched on, and may prevent current from flowing through switch 208 when switched off. When switched on, current may be free to flow through switch 208 to clamping device 206. In the configuration of FIG. 2A, switch 208 is in series with clamping device 206. As a result, when switch 208 is on, clamping device 206 may see the voltage at node 203 in circuit 200.

Control circuitry 210 may determine when to turn on switch 208. Control circuitry 210, in one embodiment, may also determine when to turn off switch 208. Control circuitry 210 may determine when to turn switch 208 on and/or off based on a number of factors. For example, control circuitry 210 may turn switch 208 on and/or off based on voltage sensed at node 203, the elapsed time since an over-voltage or surge condition was sensed, the temperature of clamping device 206, the current through switch 208 or clamping device 206, and/or the state of other SPDs in circuit 200, etc. As discussed in more detail below, control circuitry 210 may include discrete circuit components, a microprocessor, and/or a microcontroller, for example.

Figure 2B:
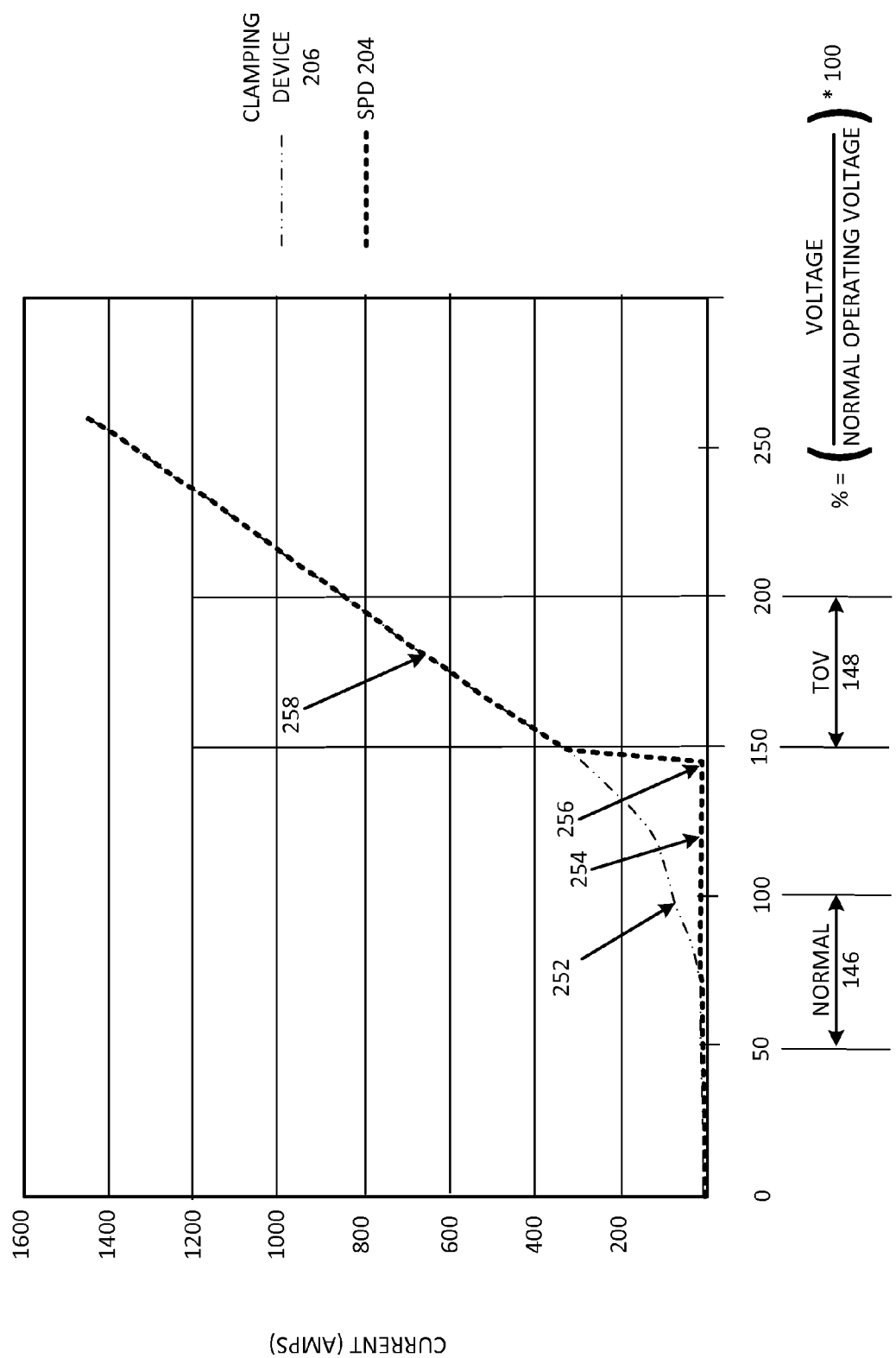
FIG. 2B is a plot of exemplary current-voltage characteristics of the clamping device and the SPD of the circuit of FIG. 2A.

FIG. 2B is a diagram of an exemplary IV characteristic of clamping device 206 (shown with a dashed and dotted line) and an exemplary IV characteristic of SPD 204 (shown with a heavy dashed line) of FIG. 2A. The IV characteristics shown in FIG. 2B illustrate concepts of the embodiments disclosed herein. The IV characteristics of actual components may vary from what is shown in FIG. 2B without departing from the embodiments described. In this example, clamping device 206 has the same IV characteristics that SPD 122 has in FIG. 1C (also indicated with a dashed and dotted line). In other words, clamping device 206 has desirable IV characteristics in TOV range 148 but undesirable IV characteristics in normal range 146 (e.g., clamping device 206 is conducting approximately 100 amps at the normal operating voltage at point 252). The IV characteristic of SPD 204, however, is not the same as the IV characteristic of clamping device 206 because clamping device 206 does not see the voltage at node 203 until switch 208 is turned on by control circuitry 210. In this example, control circuitry 210 does not turn on switch 208 until the voltage is greater than approximately 145% of the normal operating voltage. Thus, until switch 208 turns on, SPD 204 does not conduct or conducts very little current (e.g., point 254 in FIG. 2B). When switch 208 is on (e.g., at point 256), the IV characteristic of SPD 204 follows the IV characteristic of clamping device 206. As a result, in this embodiment, the IV characteristic of SPD 204 is desirable in both normal range 146 and TOV range 148.

Figure 3A:
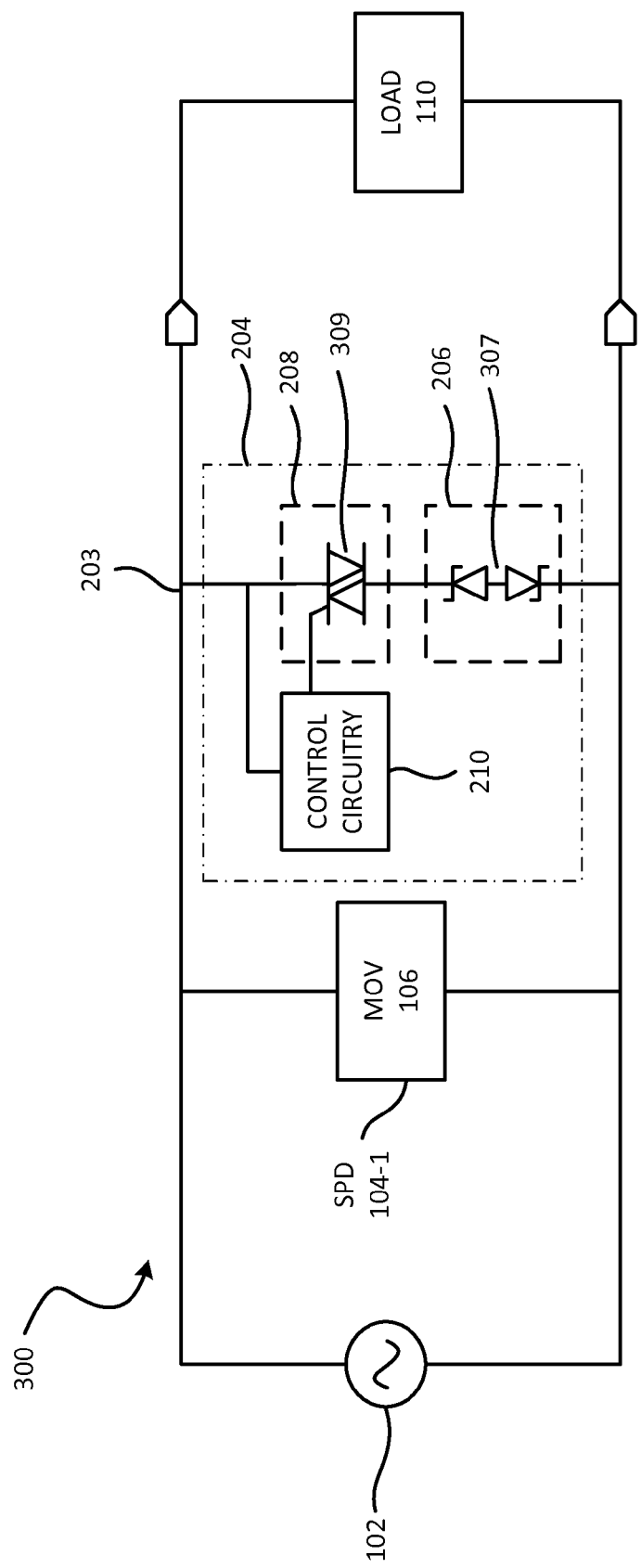
FIGS. 3A-3C are a diagrams of exemplary circuits including two SPDs in different embodiments.

FIG. 3A is a diagram of an exemplary circuit 300 including SPD 204 in another embodiment. Circuit 300, similar to circuit 200 of FIG. 2A, includes a first SPD device 104-1 (e.g., MOV 106) and a second SPD device 204. Further, SPD device 204 in circuit 300 includes a clamping device 206 in series with a switch 208, wherein control circuitry 210 turns on switch 208 at a threshold voltage (e.g., at 145% of the normal operating voltage).

Figure 3B:
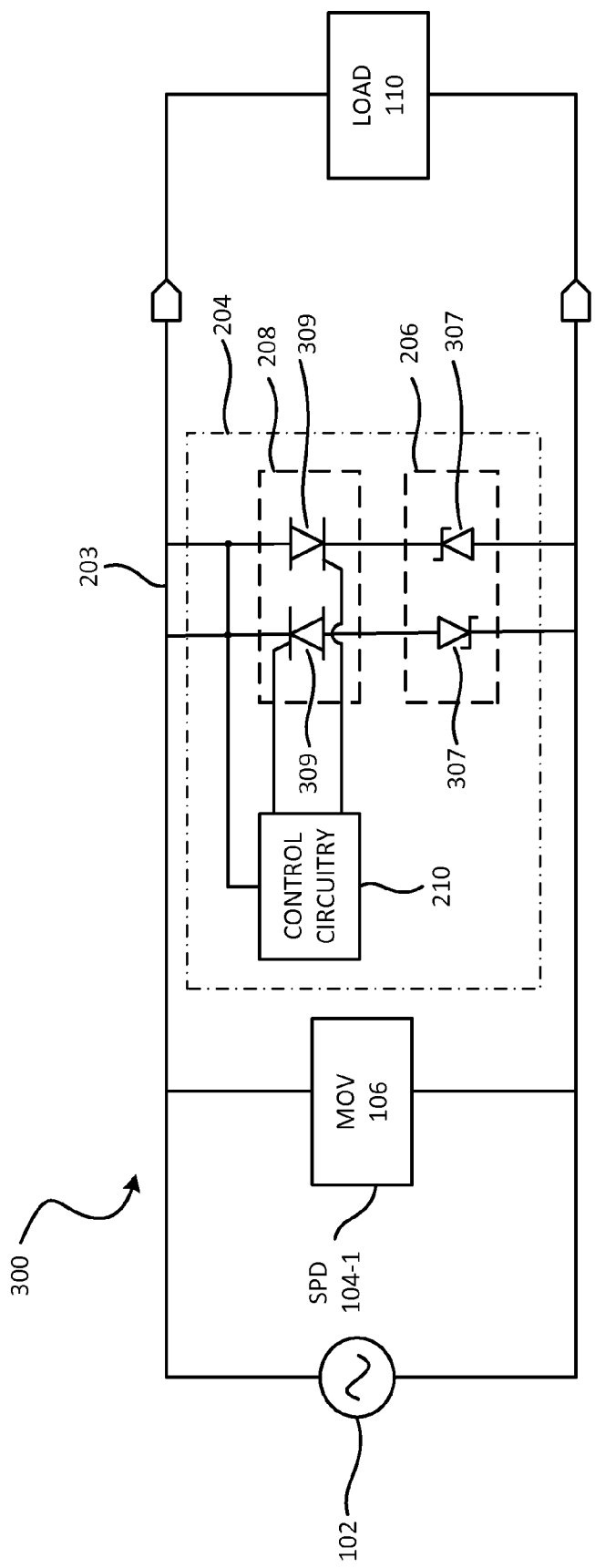

In circuit 300, switch 208 may include a thyristor 309 (e.g., a silicon-controlled rectifier). A thyristor conducts (e.g., turn on) when its gate receives current and will continue to conduct while it is forward biased (e.g., it will turn off when reverse biased). In the case of circuit 300, thyristor 309 may be thought of as two thyristors in parallel that share the same gate (e.g., see FIG. 3B). With an AC power supply 102, thyristor 309 will conduct in either direction when control circuitry 210 supplies current to the gate of thyristor 309. When control circuitry 210 removes the gate current, thyristor 309 will continue to conduct for the remaining part of the half cycle of AC power provided power supply 102; thyristor 309 will turn off with the change of polarity of the AC power supply. Thus, once control circuitry 210 removes the gate current, thyristor 309 will turn off completely within a half-cycle of power supply 102.

Switch 208 may include additional or different devices than thyristor 309. For example, switch 208 may include power transistors (e.g., field-effect transistors such as metal-oxide field effect transistors) instead of or in addition to thyristor 309. Switch 208 may include bipolar transistors, insulated-gate bipolar transistors (IGBT), a gate-turn-off (GTO) thyristor, a triode AC switch (TRIAC), a static induction transistor/thyristor (SIT/SITh), a MOS controlled Thyristor (MCT), a distributed buffer-gate turn-off thyristor (DB-GTO), an integrated gate communicated thyristor (EGCT), and/or a metal-oxide semiconductor composite static induction thyristor (MOS CSMT).

Clamping device 206 in circuit 300 includes a selenium surge suppression device (SSD) 307. SSD 307 may be modeled as back-to-back zener diodes, and SSD 307 is shown in FIG. 3A as two back-to-back zener diodes. SSD 307 may have the IV characteristics of clamping device 206 shown in FIG. 2B (e.g., the dashed dot line; non-desirable in normal range 146, but desirable in TOV range 148). The IV characteristic of thyristor 309 together with SSD 307 is as shown in FIG. 2B for SPD 204 (e.g., heavy dashed line; desirable in normal range 146 and desirable in TOV range 148). Although SPD 204 in circuit 300 is a selenium surge suppression device, other types of protective devices are possible, such as an SAD, a GDT, an MOV, zener diode(s), a transient suppression diode, a quarter-wave coaxial surge arrestor, and/or a carbon block spark gap overvoltage suppressor.

Figure 3C:
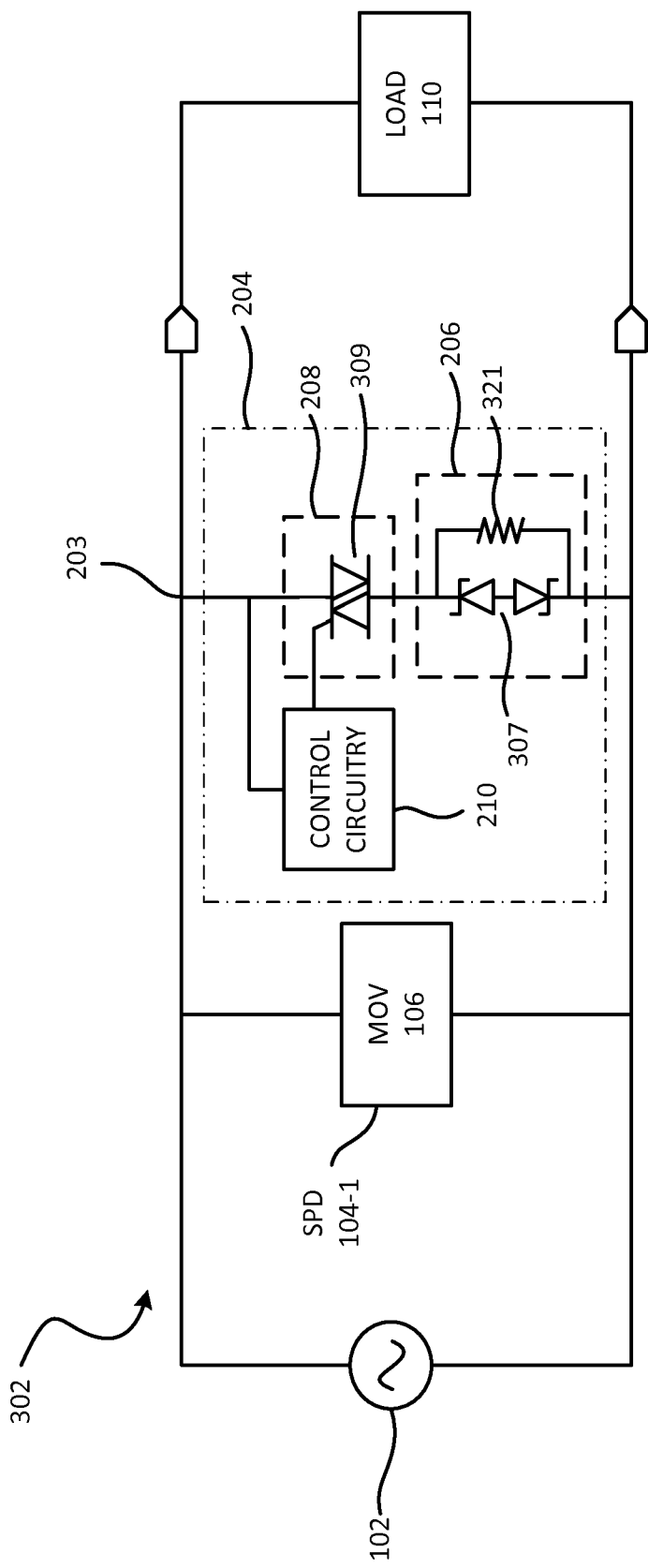

FIG. 3C is a diagram of an exemplary circuit 302 including SPDs in another embodiment. Circuit 302 is similar to circuit 300, but for the addition of resistor 321 in parallel with SSD 307. Resistor 321 may allow for the tuning of the IV characteristic (e.g., the slope of the IV characteristic) in TOV range 148. For example, the addition of resistor 321 may allow for the slope of the IV characteristic of clamping device 206 to be lower than otherwise. In another embodiment, adding a resistor in series with SSD 307 may increase the slope of the IV characteristic in TOV range 148. In another embodiment, clamping device 206 may include multiple clamping devices (e.g., a MOV in parallel with an SSD) to achieve the desired IV characteristic.

Figure 4A:
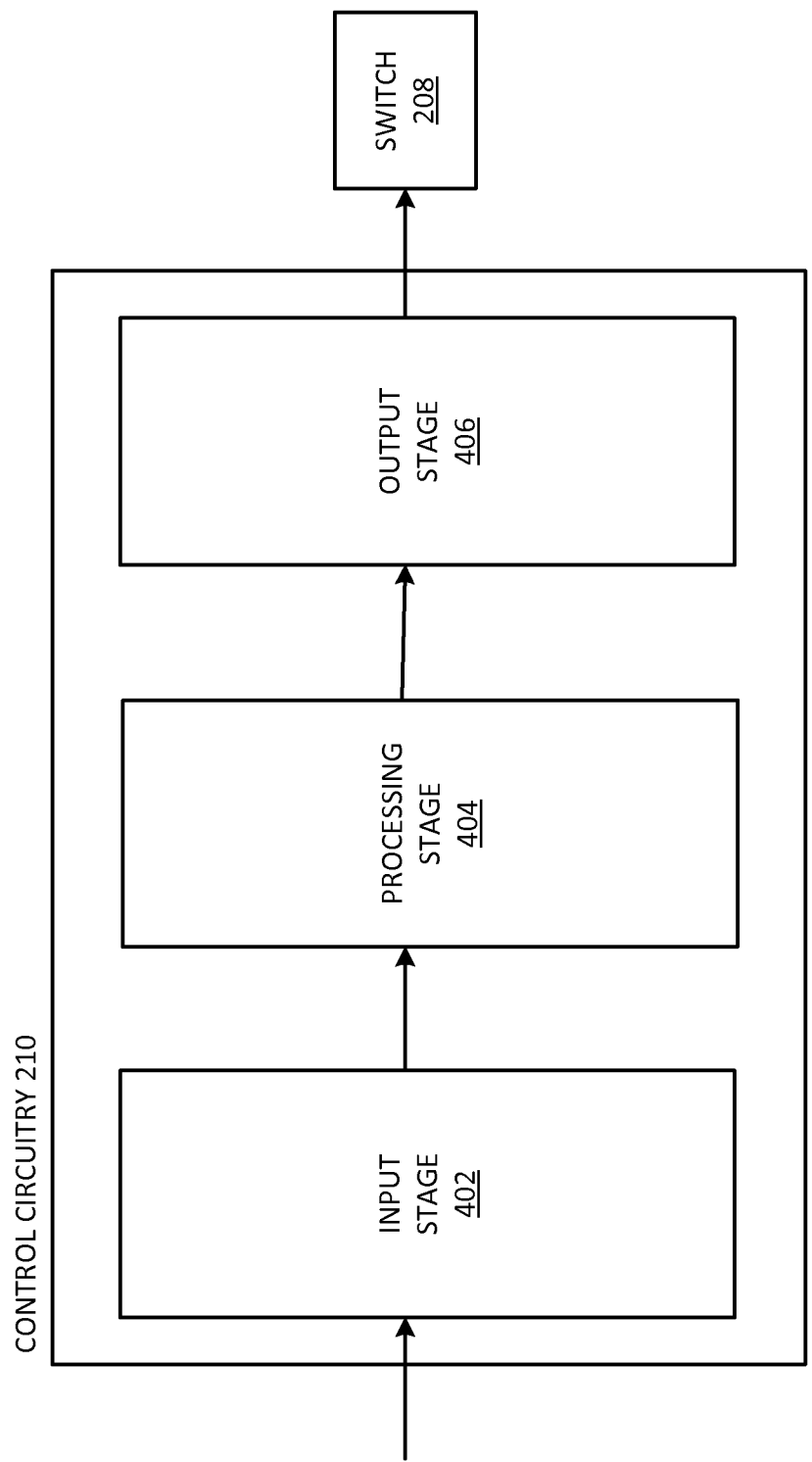
FIG. 4A is a block diagram of exemplary components of the control circuitry of FIG. 2A in one embodiment.

As discussed above, control circuitry 210 may determine whether and when to couple SSD 204 to node 203. FIG. 4A is a block diagram of exemplary components of control circuitry 210. Control circuitry 210 may include an input stage 402, a processing stage 404, and an output stage 406. Control circuitry 210 may include additional, fewer, or a different arrangement of components than shown in FIG. 4A.

Input stage 402 may sense parameters for controlling switch 208. For example, input stage 402 may sense the voltage at node 203 of circuit 200. In one embodiment, input stage 402 includes a high input-impedance so as not to draw current away from load 110 or vary the voltage at node 203. In one embodiment, input stage 402 may be omitted if the input characteristics of processing stage 404 are sufficient for controlling switch 208. In one embodiment, input stage 402 may sense the current through clamping device 206 (e.g., through switch 208 when turned on) for controlling switch 208. For example, if the current through clamping device 206 is above a threshold (or above a threshold for a period of time) then switch 208 may be turned off.

Processing stage 404 determines whether a surge (e.g., over-voltage) condition is present and/or whether to turn switch 208 on or off. In one embodiment, processing stage 404 turns switch 208 on when the voltage sensed by input stage 402 exceeds a threshold value. The threshold value may be, for example, approximately 120%, 125%, 130%, 135%, 140%, 145%, 150%, 155%, 160%, and/or 165% of the normal operating voltage. In one embodiment, processing stage 404 may turn switch 208 off when the voltage sensed by input stage 402 falls below a threshold value. The threshold value may be, for example, approximately 120%, 125%, 130%, 135%, 140%, 145%, 150%, 155%, 160%, and/or 165% of the normal operating voltage. Processing stage 404 may include discrete components (e.g., transistors), analog circuits (e.g., an operational amplifier), and/or digital circuitry (e.g., logic gates, a microprocessor, a microcontroller, etc.). In other embodiments, processing stage 404 may determine whether to turn switch 208 on or off based on the elapsed time since a surge (e.g., over-voltage) condition was sensed, the temperature of clamping device 206, the current through switch 208 or clamping device 206, and/or the state of other SPDs in circuit 200, etc.

Output stage 406 may provide sufficient current and/or voltage to change the state of switch 208 from an OFF state to an ON state. In one embodiment, output stage 406 may also provide sufficient current and/or voltage to change the state of switch 208 from an ON state to an OFF state. Output stage 406 may include, for example, discrete components (e.g., transistors) or other analog circuit components (e.g., an operational amplifier). The output impedance of output stage 406 may match the input impedance of switch 208, for example. In one embodiment, output stage 406 may be omitted if the output characteristics of processing stage 406 are sufficient for controlling switch 208.

Figure 4B:
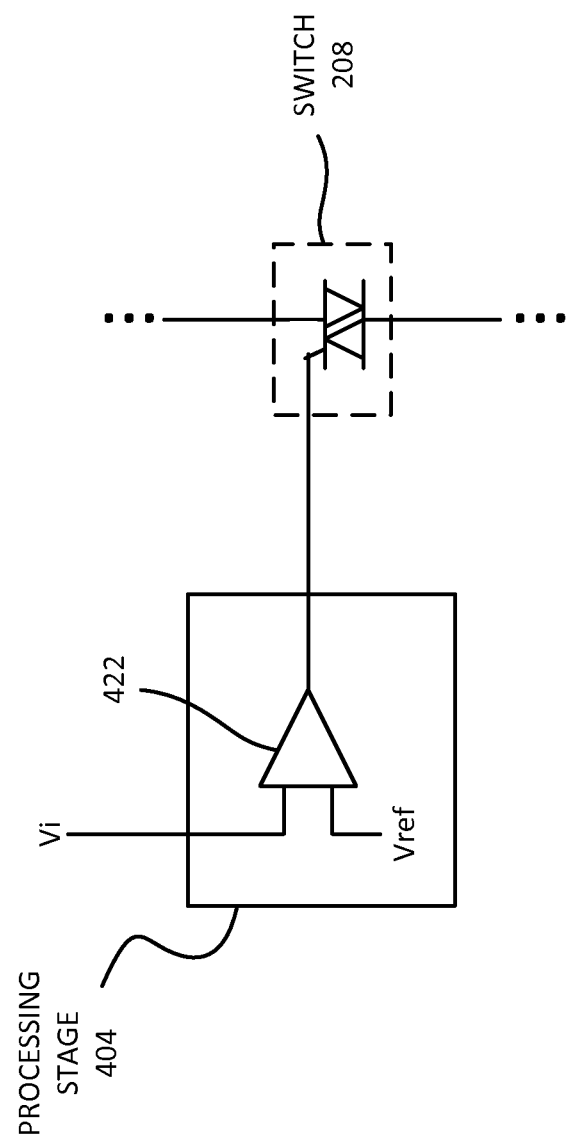
FIG. 4B is a block diagram of exemplary components of the processing stage of the control circuitry of FIG. 4A.

FIG. 4B is a block diagram of exemplary components of processing stage 404 in one embodiment. As shown, processing stage 404 may include a comparator 422. Comparator 422 may input the voltage at node 203 (Vi) and a reference voltage (Vref). The voltage at node 203 may be the peak or RMS voltage at node 203 (e.g., in the case of AC power). The reference voltage may be, for example, a DC voltage that is generated from the input voltage, for example. Reference voltage Vref may be generated by rectifying, smoothing, down-converting, and/or up-converting the input voltage, for example.

Figure 4C:
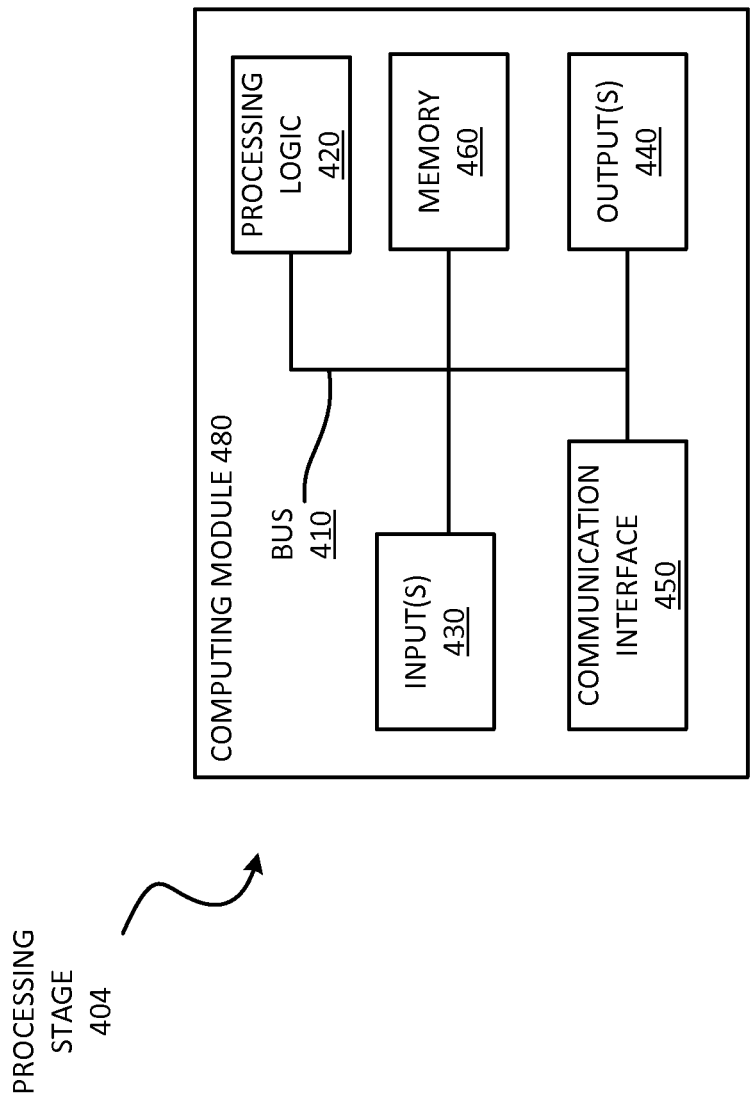
FIG. 4C is a block diagram of exemplary components of the processing stage of the control circuitry of FIG. 4A.

FIG. 4C is a block diagram of exemplary components of processing stage 404 in another embodiment. In this embodiment, processing stage 404 may include one or more computing modules (e.g., a microcontroller, a microprocessor, etc.). Computing module 480 may include a bus 410, processing logic 420, an input(s) 430, an output(s) 440, a communication interface 450, and a memory 460. Computing module 480 may include other components (not shown) that aid in receiving, transmitting, and/or processing data. Moreover, other configurations of components in computing module 480 are possible. Computing module 480 may be a single integrated circuit or may be distributed across multiple integrated circuits, for example. Computing module 480 may be implemented with digital logic components (e.g., NAND gates, etc.). In one embodiment, computing module 480 may include an application-specific integrated circuit (ASIC), a field-programmable gate array (FPGA), a multi-core processor, a reduced-instruction set computing (RISC) processor, etc.

Bus 410 may include a path that permits communication among the components of computing module 480. Processing logic 420 may be implemented in one embodiment with digital logic components. Processing logic 420 may include any type of processor or microprocessor (or families of processors or microprocessors) that interprets and executes instructions. In other embodiments, processing logic 420 may include an application-specific integrated circuit (ASIC), a field-programmable gate array (FPGA), a multi-core processor, a reduced-instruction set code (RISC) processor, etc.

Input(s) 430 may allow computing module 480 to input information from various sources. Input(s) 430 may allow computing module 480 to input conditions for determining whether to turn switch 208 on or off, for example. Input(s) 430 may input the voltage (e.g., peak voltage, RMS voltage, etc., from input stage 402) of node 203 in circuit 200, for example. In one embodiment, input(s) 430 may input the value of the current (e.g., instantaneous current) through switch 208 and/or clamping device 206. In one embodiment, input(s) 430 may input the temperature of clamping device 206. Input(s) 430 may also input the current state of other SPDs in circuit 200. Input(s) 430 may include analog or digital inputs. For example, the current voltage at node 203 may include the voltage level expressed in digits.

Output(s) 440 may output information to, for example, output stage 406. Output(s) 440 may output a logical ON to turn on switch 208 or a logical OFF to turn off switch 208. Output stage 406 may interpret output(s) 440 and may supply the appropriate voltage and/or current to switch 208 to turn switch 208 on or off. Output(s) 440 may also output information to other SPDs, for example, indicating the state of switch 208. Output(s) 440 may output information to a monitoring or control system.

Communication interface 450 may include a transceiver that enables computing module 480 to communicate with other devices or systems. Communication interface 450 may include a transmitter that converts baseband signals to radio frequency (RF) signals or a receiver that converts RF signals to baseband signals. Communication interface 450 may be coupled to an antenna for transmitting and receiving RF signals. Communication interface 450 may include a network interface (e.g., an Ethernet card) for wired communications or a wireless network interface (e.g., a WiFi) card or module for wireless communications. Communication interface 450 may also include, for example, a universal serial bus (USB) port for communications over a cable, a Bluetooth™ wireless interface, a radio-frequency identification (RFID) interface, a near-field communications (NFC) wireless interface, etc.

Memory 460 may store, among other things, information and instructions (e.g., applications, an operating system, and/or a real-time operating system) and data (e.g., application data) for use by processing logic 420. Memory 460 may include a random access memory (RAM) or another type of dynamic storage device, a read-only memory (ROM) device or another type of static storage device, and/or some other type of magnetic or optical recording medium and its corresponding drive. Memory 460 may include firmware or software.

Computing module 480 may perform the operations described herein in response to processing logic 420 executing software instructions contained in a computer-readable medium, such as memory 460. A computer-readable medium includes a physical or logical memory device. The software instructions may be read into memory 460 from another computer-readable medium or from another device via communication interface 450. The software instructions contained in memory 460 may cause processing logic 420 to perform processes that are described herein.

Figure 5:
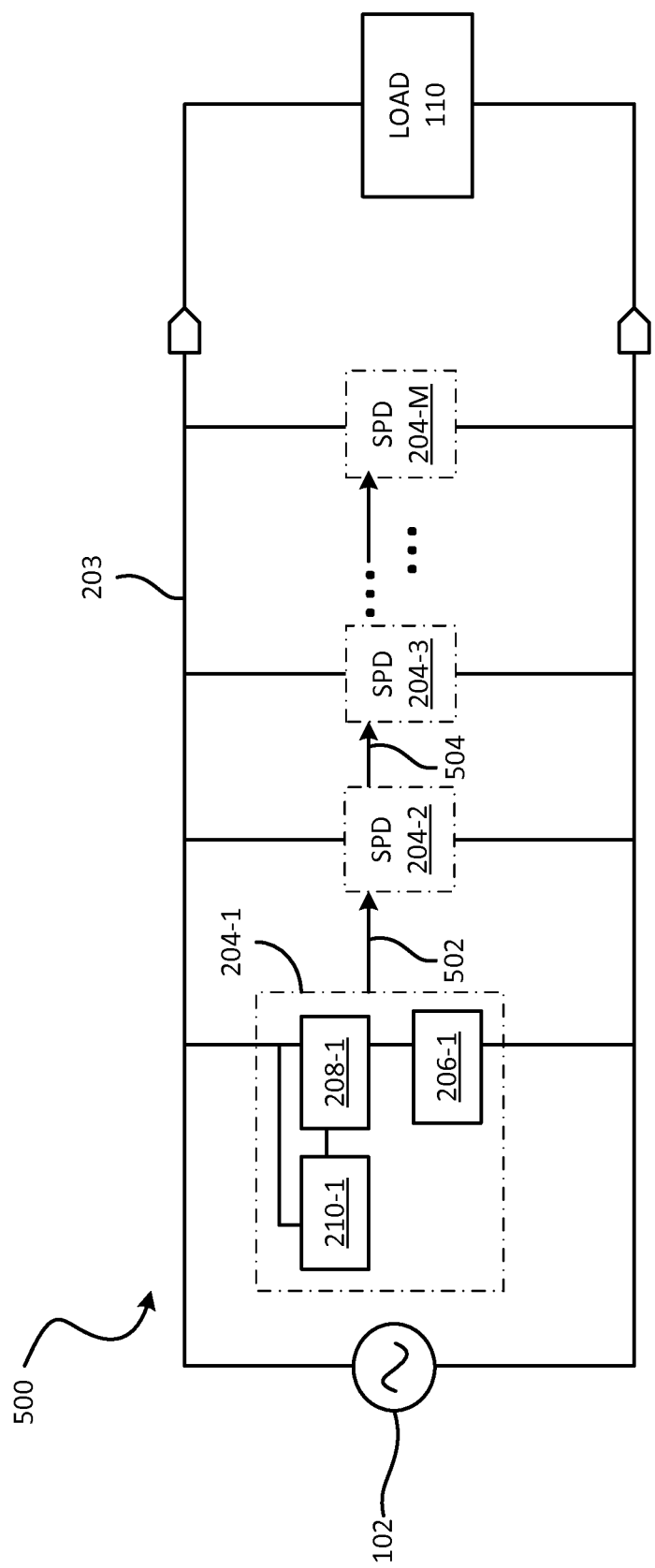
FIG. 5 is a diagram of an exemplary circuit including multiple SPDs in another embodiment.

FIG. 5 is a diagram of an exemplary circuit 500 in another embodiment for protecting load 110. Circuit 500 includes power source 102 and load 110, similar to circuits 200, 300, and 302 described above. Circuit 500 also includes a number (M) of SPDs, specifically SPD 204-1 through SPD 204-M (individually, "SPD 204-x;" collectively "SPD 204"). Each SPD 204-x may be configured similarly to SPD 204 shown in FIG. 2A, 3A, 3B, or 3C. For example, as shown in FIG. 5, SPD 204-1 may include a switch 208-1, a clamping device 206-1, and control circuitry 210-1. In this embodiment, control circuitry 210-1 may detect an over-voltage (e.g., surge) condition at node 203 and turn on switch 208-1 to couple clamping device 206-1 to node 203 to protect load 110.

SPD 204-1 may decouple clamping device 206-1 from node 203 to prevent damaging clamping device 206-1. For example, clamping device 206-1 may be decoupled after a set period of time or after a period of time that depends on the current passing through clamping device 206-1 or the temperature of clamping device 206-1. In this case, SPD 204-1 (e.g., control circuitry 210-1 in SPD 204-1) may send a signal 502 to SPD 204-2 for SPD 204-2 to couple clamping device 206-2 (not shown) to node 203 for protecting load 110. At a certain time, SPD 204-2 may decouple clamping device 206-2 from node 203 to prevent damaging clamping device 206-2 itself. In this case, SPD 204-2 may send a signal 504 to SPD 204-3 for SPD 204-3 to couple clamping device 206-3 (not shown) to node 203. In this embodiment, for example, by the time SPD 204-M couples clamping device 206-M (not shown) to node 203, clamping device 206-1 may have recovered and may again be coupled to node 203. In one embodiment, SPD 204-1 may be programmed to shunt current at a first voltage, SPD 204-2 may be programmed to shunt current at a second voltage (e.g., higher than the first voltage), SPD 204-3 may be programmed to shunt current at a third voltage (e.g., higher than the second voltage), etc., wherein each SPD 204-x shunts current at incrementally higher voltages. This embodiment is well suited for instances with resistors in parallel with clamping device 206-x. In this case, successive resistors may vary (e.g., increase) in power dissipated per ohm (watts/ohm).

Figure 6:
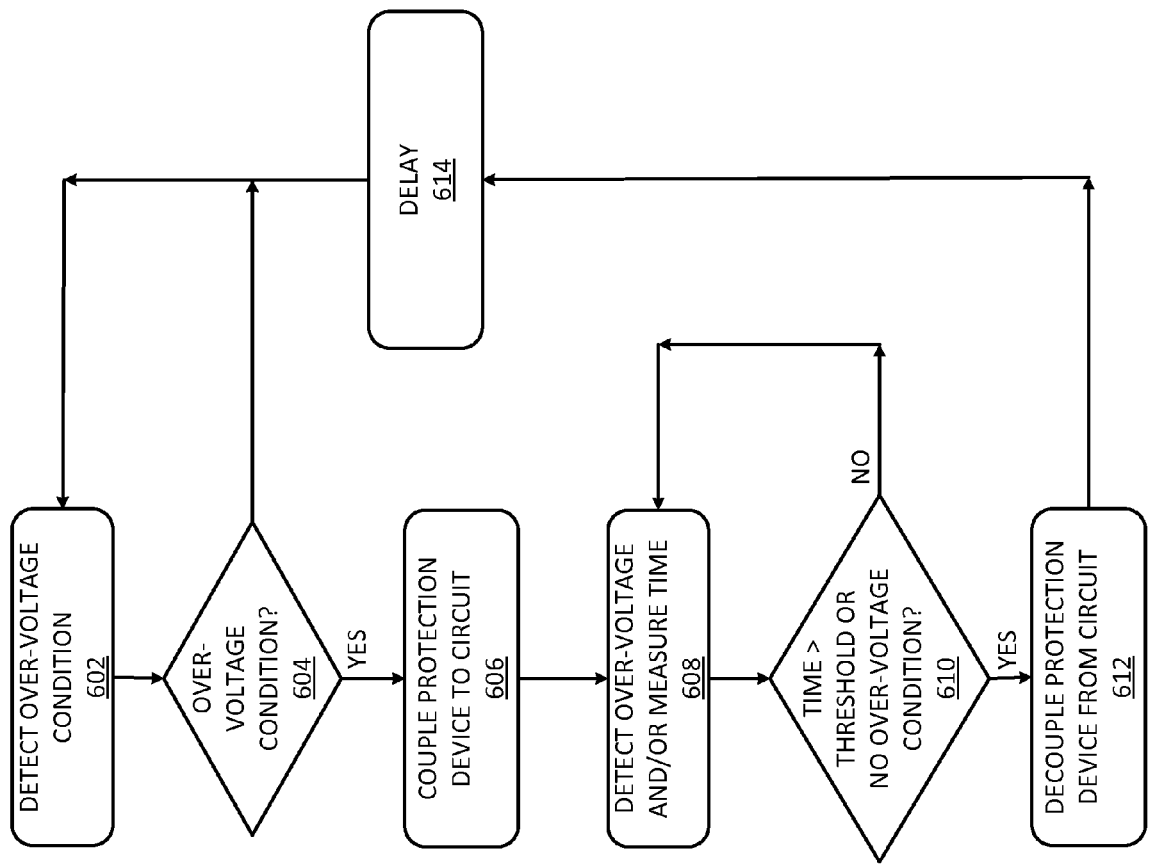
FIG. 6 is a flowchart of an exemplary process for protecting a load with an SPD.

FIG. 6 is a flowchart of an exemplary process 600 for protecting load 110 from an over-voltage (e.g., surge) condition. Process 600 may run to protect load 110 in circuit 200, circuit 300, circuit 302, and/or circuit 500. In one embodiment, process 600 may run in control circuitry 210 (e.g., in one or more computing modules 480, in input stage 402, processing stage 404, and/or output stage 406). Process 600 begins with detection of an over-voltage (e.g., surge) condition (block 602). Detecting an over-voltage condition may include sensing the voltage at node 203 in circuits 200, 300, 302, or 500. Detecting an over-voltage condition may include detecting that the peak voltage at node 203 is greater than a threshold above the normal operating voltage (e.g., 150%). In circuit 500, for example, detecting an over-voltage condition may include receiving a signal from another SPD that a surge condition exists. If there is no over-voltage (e.g., surge) condition (block 604: NO), then process 600 returns to block 602 for the continued detection of an over-voltage.

If there is an over-voltage (e.g., surge) condition (block 604: YES), then a clamping device may be coupled to the circuit to protect the load (block 606). For example, in circuit 200, clamping device 206 may be coupled to node 203. In circuit 300, SSD 307 may be coupled to node 203. In circuit 302, resistor 321 and SSD 307 may be coupled to node 302. In these cases, a switch (e.g., switch 208 and/or thyristor 309) may be turned on by output stage 406, for example, to couple the clamping device to node 203.

The over-voltage condition may continue to be detected (block 608) after the over-voltage condition begins. Similar to the description above, detecting an over-voltage condition at block 608 may include sensing the voltage at node 203 in circuits 200, 300, 302, or 500, and/or sensing the current flow through the clamping device. In addition to the detection of the over-voltage condition, the elapsed time since the beginning of the over-voltage detection may be monitored (block 608). In one embodiment, process 600 may measure the amount of time that the clamping device (e.g., clamping device 206) is coupled to node 203 so that the clamping device may be decoupled if the over-voltage condition lasts long enough that the clamping device may fail. If the over-voltage condition continues to exist and the time since the over-voltage condition began is below a threshold time (block 610: NO), then process 600 may continue to block 608 where surge (e.g. over-voltage) conditions and time are again monitored (e.g., continuously monitored).

If an over-voltage condition no longer exists or if the elapsed time since the beginning of the over-voltage condition exceeds a threshold (block 610: YES), then the over-voltage (e.g., surge) protective device may be decoupled from the circuit (block 612). Decoupling the clamping device from the circuit may include, in the case of thyristor 309, reverse biasing thyristor 309. In this embodiment, the control circuitry that decouples the clamping device may send a signal for another clamping device to be coupled to the circuit, as described above with respect to circuit 500. In this case, process 600 may delay (block 614) before returning to block 602 where over-voltage conditions are detected. Process 600 may delay (block 614) in order to give the clamping device (e.g., clamping device 206) time to recover (e.g., cool down) prior to being used in a subsequent over-voltage condition.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A surge protective device, comprising:
   a comparator to determine when a line voltage of a line is above a threshold; and
   a first switch to couple a first clamping device to the line when the comparator determines the line voltage is above the threshold, wherein the first clamping device shunts current from the line;
   a second switch to couple a second clamping device to the line when the comparator determines the line voltage is above the threshold, wherein the second clamping device shunts current from the line,
   wherein the second switch is configured to couple the second clamping device to the line after the first switch couples the first clamping device to the line,
   wherein the first switch is configured to decouple the first clamping device from the line after having coupled the first clamping device to the line, when the comparator determines the line voltage continues to be above the threshold, such that the first clamping device is not coupled to the line for a period of time after the second clamping device is coupled to the line, and
   wherein the first switch is configured to couple the first clamping device to the line a second time when the comparator determines that the line voltage continues to be above the threshold and when the first clamping device has recovered from previously shunting current.

2. The surge protective device of claim 1, wherein at least one of the first switch or the second switch includes a silicon-controlled rectifier (SCR) or a thyristor.

3. The surge protective device of claim 1, wherein at least one of the first switch or the second switch includes a field-effect transistor, a bipolar transistor, an insulated-gate bipolar transistor, or a gate-turn-off (GTO) thyristor.

4. The surge protective device of claim 1, wherein at least one of the first clamping device or the second clamping device includes a selenium surge suppression device.

5. The surge protective device of claim 4, further comprising a resistor in parallel with the selenium surge suppression device, wherein at least one of the first or second switch couples the line voltage to the resistor when the comparator determines that the line voltage is above the threshold.

6. The surge protective device of claim 2, wherein at least one of the first clamping device or the second clamping device includes a silicon avalanche diode (SAD), a gas discharge tube (GDT), a metal-oxide varistor (MOV), a zener diode, a transient suppression diode, a quarter-wave coaxial surge arrestor, a Silicon Carbide varistor (SiCV), or a carbon block spark gap overvoltage suppressor.

7. The surge protective device of claim 1, further comprising a metal-oxide varistor (MOV) coupled to the line to shunt current from the line before the first switch couples the line voltage to the clamping device.

8. The surge protective device of claim 1, wherein the first switch and the second switch are configured to decouple the clamping device from the line voltage when the comparator determines the line voltage is below a threshold.

9. The surge protective device of claim 1, further comprising a microcontroller including the comparator.

10. The surge protective device of claim 8, wherein the first clamping device includes a metal-oxide varistor (MOV), and wherein the first switch is configured to couple the MOV to the line a second time when the comparator determines the line voltage continues to be above the threshold and the first clamping device has recovered from previously shunting current.

11. A surge protective device, comprising:
    processing logic to determine when a line voltage of a line is in a surge condition; and
    a first switch, controlled by the processing logic, to couple a first clamping device to the line when the processing logic determines the line voltage is in the surge condition, wherein the first clamping device shunts current from the line;
    a second switch, controlled by the processing logic, to couple a second clamping device to the line when the processing logic determines the line voltage is in the surge condition, wherein the second clamping device shunts current from the line, wherein the processing logic is configured to control the second switch to couple the second clamping device to the line after the first switch couples the first clamping device to the line, wherein the processing logic is configured to control the first switch to decouple the first clamping device from the line after having coupled the first clamping device to the line, when the processing logic determines the line voltage continues to be in the surge condition, such that the first clamping device is not coupled to the line for a period of time after the second clamping device is coupled to the line, and wherein the processing logic is configured to control the first switch to couple the first clamping device to the line a second time when the processing logic determines that the line voltage continues to be in the surge condition and that the first clamping device has recovered from previously shunting current.

12. The surge protective device of claim 11, wherein the first switch or the second switch includes a silicon-controlled rectifier (SCR) or a thyristor.

13. The surge protective device of claim 11, wherein the first switch or the second switch includes a field-effect transistor, a bipolar transistor, an insulated-gate bipolar transistor, or a gate-turn-off (GTO) thyristor.

14. The surge protective device of claim 11, wherein the first clamping device or the second clamping device includes a selenium surge suppression device.

15. The surge protective device of claim 14, further comprising a resistor in parallel with the selenium surge suppression device, wherein the switch couples the line voltage to the resistor when the processing logic determines that the line voltage is in the surge condition.

16. The surge protective device of claim 12, wherein the first clamping device or the second clamping device includes a silicon avalanche diode (SAD), a gas discharge tube (GDT), a metal-oxide varistor (MOV), a zener diode, a transient suppression diode, a Silicon Carbide varistor (SiCV), a quarter-wave coaxial surge arrestor, or a carbon block spark gap overvoltage suppressor.

17. The surge protective device of claim 15, further comprising a metal-oxide varistor (MOV) coupled to the line to shunt current from the line before the first switch couples the line voltage to the first clamping device.

18. The surge protective device of claim 17, wherein the processing logic is configured to control the first switch and the second switch to decouple the first clamping device and the second clamping device from the line voltage when the processing logic determines the line voltage is not in the surge condition.

19. The surge protective device of claim 18, wherein the processing logic includes a microcontroller.

20. The surge protective device of claim 18, wherein the first clamping device includes a metal-oxide varistor (MOV), and wherein the first switch is configured to couple the MOV to the line a second time when the processing logic determines the line voltage continues to be in the surge condition and the first clamping device has recovered from previously shunting current, and wherein the processing logic is configured determine the first clamping device has recovered from previously shunting current based on a delay of time.

\* \* \* \* \*